(12) United States Patent
O'Dwyer (10) Patent No.: US 12,207,624 B2
(45) Date of Patent: Jan. 28, 2025

(54) METHOD AND APPARATUS FOR SELECTIVE BEHAVIOR MODIFICATION OF A DOMESTICATED ANIMAL

(71) Applicant: Paul T. O'Dwyer, Webster, NY (US)

(72) Inventor: Paul T. O'Dwyer, Webster, NY (US)

( * ) Notice: Subject to any disclaimer, the term of this patent is extended or adjusted under 35 U.S.C. 154(b) by 121 days.

(21) Appl. No.: 17/519,726

(22) Filed: Nov. 5, 2021

(65) Prior Publication Data

US 2023/0143669 A1 May 11, 2023

(51) Int. Cl.
*A01K 15/02* (2006.01)
*A01K 11/00* (2006.01)
*A01K 29/00* (2006.01)

(52) U.S. Cl.
CPC .......... *A01K 15/021* (2013.01); *A01K 11/006* (2013.01); *A01K 29/005* (2013.01)

(58) Field of Classification Search
None
See application file for complete search history.

(56) References Cited

U.S. PATENT DOCUMENTS

| | | | |
|---|---|---|---|
| 4,322,913 A | 4/1982 | Himmer | |
| 5,604,478 A | 2/1997 | Grady et al. | |
| 6,297,739 B1 | 10/2001 | Small | |
| 6,944,990 B2 | 9/2005 | Noyes | |
| 7,409,924 B2* | 8/2008 | Kates | A01K 15/021 |
| | | | 119/908 |
| 9,955,671 B1* | 5/2018 | Turocy | A01K 15/021 |
| 10,080,343 B1* | 9/2018 | Chu | A01K 5/0114 |
| 10,091,017 B2 | 10/2018 | Andow et al. | |
| 10,104,871 B2* | 10/2018 | Triener | A01K 31/12 |
| 2005/0040954 A1 | 2/2005 | McNally | |
| 2006/0011145 A1* | 1/2006 | Kates | A01K 15/02 |
| | | | 119/859 |
| 2006/0208910 A1* | 9/2006 | Tolner | H04M 1/2725 |
| | | | 379/159 |
| 2008/0236514 A1* | 10/2008 | Johnson | A01K 15/021 |
| | | | 340/573.3 |
| 2008/0314335 A1* | 12/2008 | Kates | A01K 15/021 |
| | | | 119/908 |
| 2009/0051548 A1* | 2/2009 | Dundon | A01K 1/035 |
| | | | 340/573.3 |
| 2009/0195393 A1 | 8/2009 | Tegeler | |
| 2009/0201160 A1* | 8/2009 | Acrey | E06B 7/32 |
| | | | 340/573.3 |

(Continued)

OTHER PUBLICATIONS

Gibeault, Stephanie, (Dec. 2020) "How To Teach Your Dog to Go to Their Place" American Kennel Club https://www.akc.org/expert-advice/training/teaching-go-to-your-place/:1-11.

(Continued)

*Primary Examiner* — Muhammad Adnan
(74) *Attorney, Agent, or Firm* — Brian B. Shaw, Esq.; Jodi A. Reynolds, Esq.; Harter Secrests & Emery LLP (57) ABSTRACT

A system for training a domesticated animal includes a platform having a detector for generating a signal corresponding to performance of a predetermined behavior by the animal, wherein the signal is transmitted to a controller. Upon the animal performing the predetermined behavior for a predetermined period of time, the controller generates a feedback indicator to the animal and a caretaker message to a caretaker.

20 Claims, 5 Drawing Sheets

(56) References Cited

U.S. PATENT DOCUMENTS

| | | | |
|---|---|---|---|
| 2011/0221605 A1* | 9/2011 | Niemann | A01K 15/021 |
| | | | 340/666 |
| 2012/0299731 A1* | 11/2012 | Triener | G16Z 99/00 |
| | | | 702/19 |
| 2013/0220235 A1 | 8/2013 | Wisdom | |
| 2014/0251234 A1* | 9/2014 | Deutsch | A01K 15/021 |
| | | | 340/573.3 |
| 2015/0161906 A1 | 6/2015 | Lorkowski | |
| 2016/0061481 A1* | 3/2016 | Wolfe | F24F 11/52 |
| | | | 454/289 |
| 2016/0324121 A1* | 11/2016 | Rains | A01K 1/0107 |
| 2017/0095206 A1* | 4/2017 | Leib | A61B 5/14542 |
| 2018/0132453 A1* | 5/2018 | Foster | A01K 15/021 |
| 2019/0029226 A1* | 1/2019 | Triener | A01K 1/0107 |
| 2019/0167106 A1* | 6/2019 | Couse | A61B 5/6802 |
| 2019/0335708 A1* | 11/2019 | Trottier | G08B 5/22 |
| 2019/0380311 A1* | 12/2019 | Crouthamel | A01K 11/004 |

OTHER PUBLICATIONS

Richardson, Shelby, (2016) "Critter Sitter:Weight Sensing Pet Door" California Polytechnic State University San Luis Obispo:1-34.

* cited by examiner

METHOD AND APPARATUS FOR SELECTIVE BEHAVIOR MODIFICATION OF A DOMESTICATED ANIMAL

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

REFERENCE TO A SEQUENCE LISTING

Not applicable.

STATEMENT REGARDING PRIOR DISCLOSURES BY THE INVENTOR OR A JOINT INVENTOR

Not applicable.

BACKGROUND OF THE INVENTION

Field of the Invention

The present disclosure relates to the selective behavior modification of a domesticated animal, and particularly to training a domesticated animal such as a dog to communicate a need for assistance to humans by providing (i) a feedback indicator to the dog after a predetermined delay from an event detection and (ii) a caretaker message to a caretaker.

Description of Related Art

Animals are utilized by humans as both pets and working companions. A popular example is the dog. In addition to providing companionship, many dogs also provide highly specialized functions such as guide dogs, drugs-seeking dogs, or rescue dogs. In order for animals to co-exist successfully with humans in their daily life, obedience training is of fundamental importance. Humans need to maintain a certain level of control over the behaviors of an animal.

Typically, the first behavior which requires training is in relation to bathroom breaks. In a domestic situation for example, a dog must be trained to go outside to perform the function rather than soiling the interior. With repeated training over time, dog and caretaker come to understand behavioral patterns and the situation gradually comes under control. It is a manual process, and suffers from the following drawbacks:

Bathrooms breaks are not 100% repeatable in terms of time of occurrence, leading to the occasional 'accident'. The timing can be dependent on variables having relatively large ranges and impacts, such as the amount of water consumed by the dog and the timing of the consumption.

Secondly, it is sometimes necessary to leave the dog in the care of a sitter, who would not have the same rapport with the animal, resulting in increased frequency of 'mishaps', which can be distressing for both sitter and animal.

A third problem relates to the sale or transfer of the animal—the new owner has to rebuild a new relationship with the animal, which again results in 'mishaps'. This can be particularly difficult in the case of a guide dog, where the new owner is a blind person and unable to see the physical behavior of the animal.

Therefore, the need exists for a system than can provide feedback to the animal and communication to the trainer so as to allow for developing and rewarding certain behaviors.

BRIEF SUMMARY OF THE INVENTION

Generally, the present disclosure provides an apparatus for training a domesticated animal, wherein the apparatus includes a first detector configured to generate a signal corresponding to a presence of the domesticated animal in a predetermined position relative to the first detector; and a controller operably connected to the first detector, the controller configured to (i) generate a feedback indicator perceptible by the animal after a first delay from the signal, and (ii) lockout for a predetermined period, a subsequent feedback indicator in response to a subsequent signal from the first detector.

The present disclosure further provides an apparatus for training a domesticated animal, wherein the apparatus includes a platform configured to be occupied by the domesticated animal, the platform having a weight sensor configured to generate a signal corresponding to a weight of the domesticated animal in response to a presence of the domesticated animal relative to the weight sensor; and a controller operably connected to the weight sensor, the controller configured to generate (i) a feedback indicator perceptible by the animal after a first delay from the generation of the signal and (ii) a caretaker message transmitted through a wireless communication to a portable communication device.

The present disclosure contemplates a method for training a domesticated animal, wherein the method includes the steps of receiving a signal from a detector, the signal corresponding to a presence of a domesticated animal in a predetermined location; generating, after a predetermined period of time, at least one of (i) a feedback indicator directed to the animal and (ii) a caretaker message directed to a caretaker; and delaying generation of a subsequent feedback indicator until after a given period from the generated feedback indicator.

The following will describe embodiments of the present disclosure, but it should be appreciated that the present disclosure is not limited to the described embodiments and various modifications of the invention are possible without departing from the basic principles. The scope of the present disclosure is therefore to be determined solely by the appended claims.

DETAILED DESCRIPTION OF THE INVENTION

Figure 1:
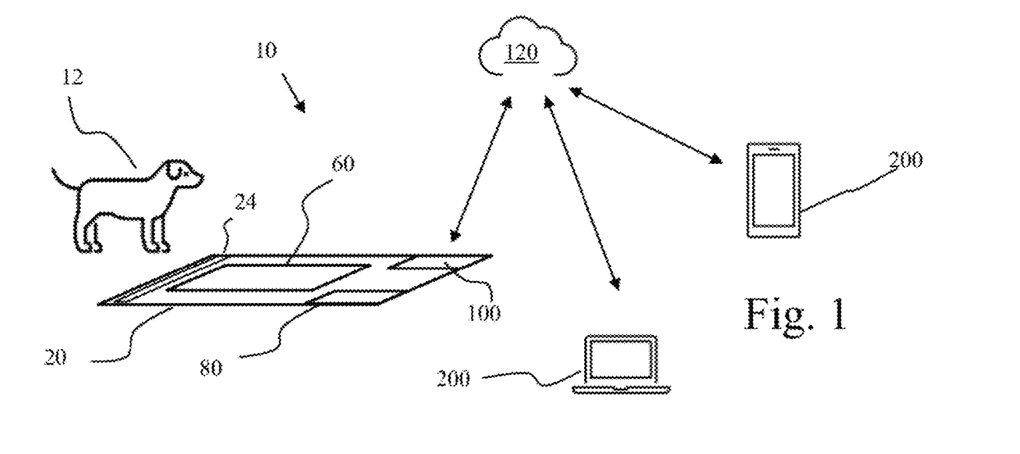
FIG. 1 is schematic of a configuration of the present system including the platform, a controller, a first remote user and a second remote user.

Referring to FIG. 1, the present system 10 includes a platform 20, a detector (signal generator) 60, a controller 100, and at least one remote User Equipment (UE) 200, wherein the system is configured for implementing selective behavior modification of a domesticated animal 12. Generally, the animal 12 performs a desired behavior which is sensed by the detector 60 which in turn sends a signal to the controller 100, wherein the controller is configured to subsequently generate (i) a feedback indicator to the animal and (ii) a caretaker message to the caretaker.

The domesticated animal 12 can be any of a variety of domesticated animals including, but not limited to cats, dogs, pigs, goats, horse, cows. For purposes of description, the present system is set forth in terms of the domesticate animal 12 being a dog, however it is understood the description is not limited to dogs.

The platform 20 provides a surface 22 in proximity to the ground, wherein the surface can be occupied by the animal 12. In one configuration, the platform 20 is a mat 28 in proximity to the ground, wherein the mat is configured for the animal 12 to occupy. As the platform 20 can be the mat 28 with the controller 100 and the detector 60 embedded in the mat, the platform can thus be directly on the ground, without any intervening legs. However, it is understood the platform 20 can be any of a variety of configurations and heights, which accommodate occupation by the animal 12. The platform 20 can include friction pads 24 on the surface exposed to the animal 12 as well as the surface contacting the ground, wherein the friction pads are configured to reducing slipping or the animal relative to the platform and the platform relative to the ground.

The platform 20 includes or cooperates with the detector 60, wherein the detector is configured to detect an event, such as the presence of the animal 12 relative to the detector or the platform. The detector 60 generates an electrical signal in response to an event detection, such as a mechanical displacement in the detector, and communicates a corresponding signal to the controller 100. The event can be the presence of the animal 12 in a predetermined area, or passed a predetermined line or area, as well as a weight of the animal, a sound of the animal, or an image of the animal. Thus, the event detection is the signal of the animal 12 performing or accomplishing the event.

Figure 2:
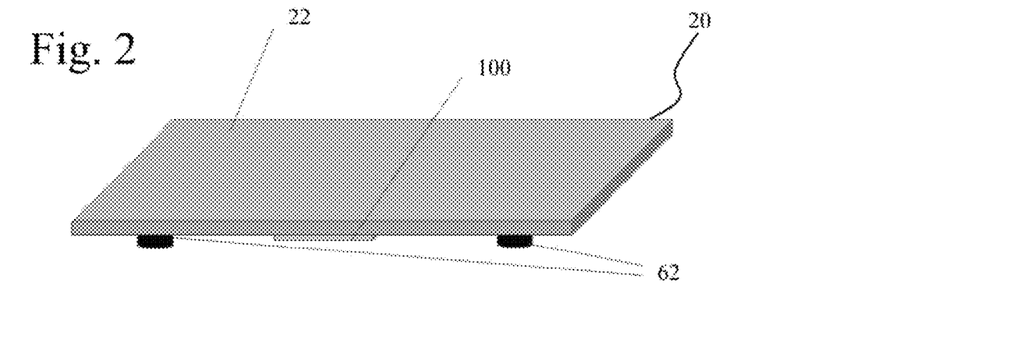
FIG. 2 is a perspective view of an embodiment of the platform and controller using a mass sensing detector.
Figure 3:
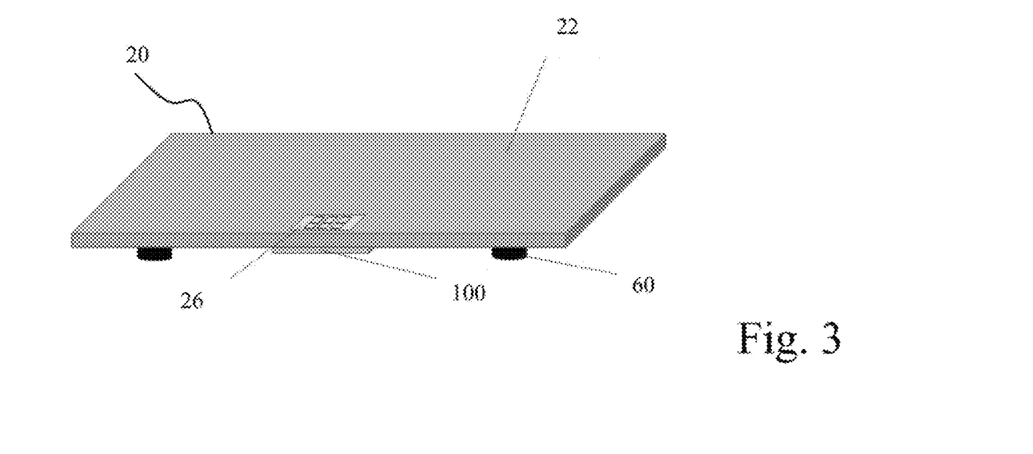
FIG. 3 is a perspective view of an embodiment of the platform and controller using a weight sensing detector and a local display.

The detector 60 can be any of a variety of mechanisms for sensing or detecting a weight, a location or presence, or a movement of the animal 12. The detector 60 encompasses detection by any physical phenomenon such as optical, thermal, electrical, mechanical, or electromagnetic. Referring to FIG. 2, in one configuration, the detector 60 is a sensor 62 which responds to the mass of the animal 12 such as a weighing scale. The detectors 60, such as weight sensors 62 or scales, can be located on a bottom of the platform 20, thus providing an interface to the ground or floor. In one configuration, the sensor 62 includes a friction reducing surface configured to contact a floor. As seen in FIG. 3, the platform 20 can include a display 26 connected to the controller 100 for selectively displaying information, such as a weight of the animal 12. As set forth below, the display 26 can also provide a feedback indicator, such as a light or visible signal to the animal 12.

Figure 4:
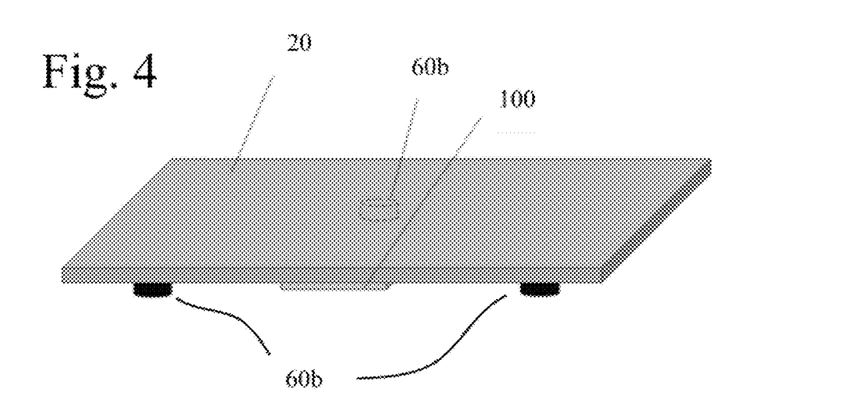
FIG. 4 is a perspective view of art embodiment of the platform and controller using a weight sensing detector and a local display.

Referring to FIG. 4, the platform 20 can include a first detector 60a and a second detector 60b, wherein the first detector is a weight sensor and the second detector is an accelerometer, wherein the accelerometer provides a signal to the controller corresponding to movement of the animal. Although two different detectors are shown, it is contemplated that the platform 20 can include two of the same type of detectors, or more than two detectors, wherein the detectors are all of the same type or different types.

Figure 5:
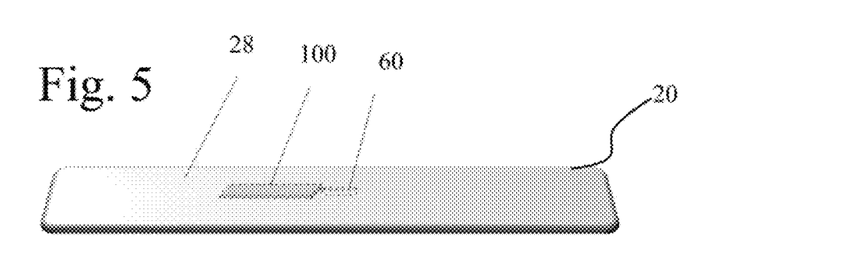
FIG. 5 is a perspective view of an embodiment of a mat with a pet detection system.

Referring to FIG. 5, the platform 20 is configured as the mat 28, wherein the detector 60 is embedded in the mat, and is a vibration or movement sensor such as an accelerometer, which is triggered by movement or positioning of the animal 12 on the platform.

Figure 6:
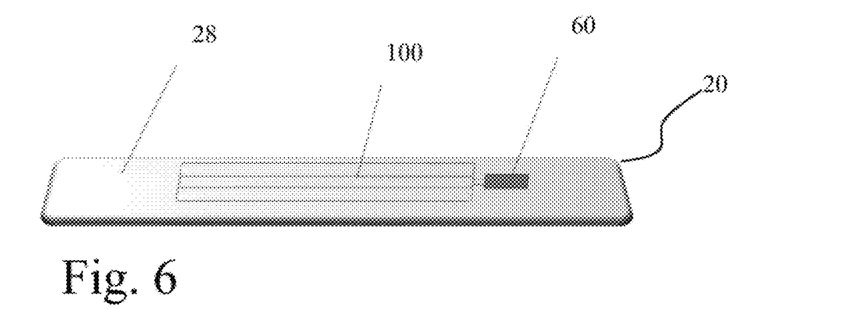
FIG. 6 is a perspective view of a an embodiment of a mat configured with embedded wireless communication and pet detection.

As shown in FIG. 6, the platform 20 is configured as the mat 28, wherein the detector 60 is an embedded strain gauge connected to the controller 100. Thus, as the animal 12 steps on the detector, the strain gauge is mechanically displaced and the event is detected.

Figure 7:
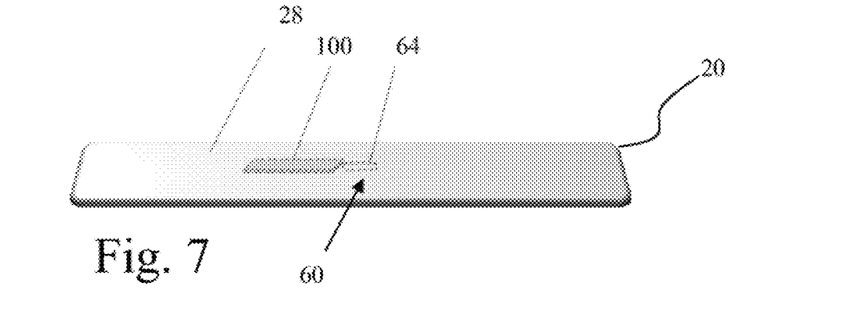
FIG. 7 is a perspective view of an embodiment of a mat configured with embedded wireless communication and radio-frequency identification (RFID) pet detection.

In the configuration of FIG. 7, the detector 60 incorporates an RFID reader 64, as known in the art. The RFID reader 64 can detect the presence of proximal RFID tag. The RFID tag can be worn by the animal on a collar, or alternatively embedded in the animal 12. Thus, when the RFID tag is within the readable range, the event detection occurs. As set forth above, it is contemplated the controller 100 can cooperate with a plurality of detectors 60, thus as the RFID reader 64 provides a signal to the controller, a second detector such as an accelerometer or light beam can provide a separate signal to the controller, wherein the controller uses both signals to confirm generation of the feedback indicator and the caretaker message.

Figure 8:
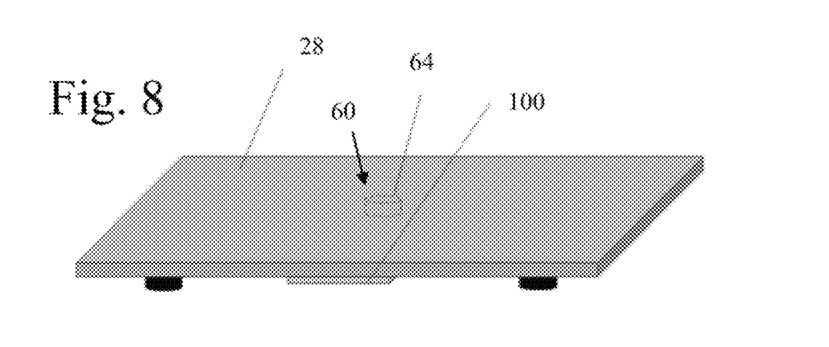
FIG. 8 is a perspective view of an embodiment of a platform configured with embedded wireless communication and radio-frequency identification (RFID) pet detection.

Referring to FIG. 8, the controller 100 is located on a bottom of the platform 20, wherein the detector 60 is an RFID reader 64 connected to the controller.

Figure 9:
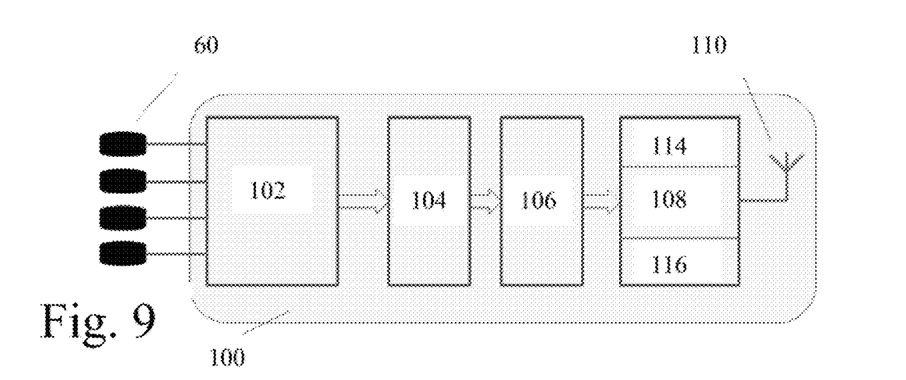
FIG. 9 is a schematic of the components of an electronic circuit of the controller.

In FIG. 9, the platform 20 is shown with at least one detector 60 connected to the controller 100, wherein the controller includes an electrical interconnection circuit 102 interfacing with the detector, an analog to digital conversion circuit 104 along with a processor 106 and a communications module 108 such as a wireless communications circuit with two-way communications and an antenna 110.

Figure 10:
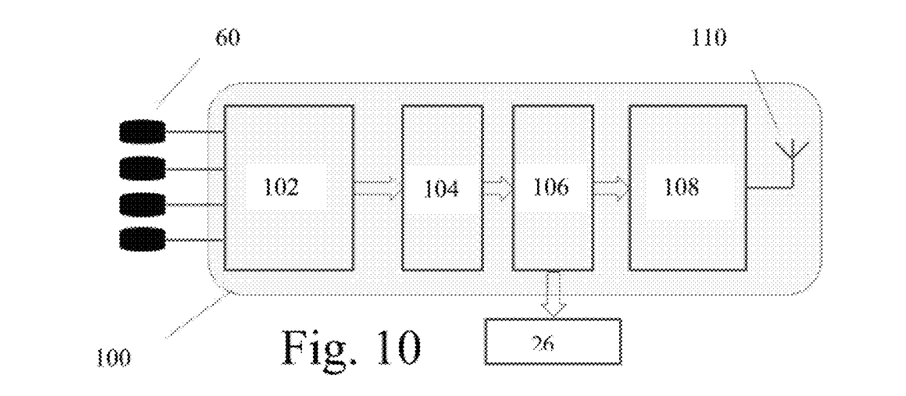
FIG. 10 is a schematic of the components of an electronic circuit of the controller.

In FIG. 10, the platform 20 is shown with at least one detector 60 connected to the controller 100, wherein the controller includes the electrical interconnection circuit 102 interfacing with the detector, the analog to digital conversion circuit 104 connected to the processor 106 in communication with the communications module 108 such as a wireless communications circuit with two-way communications and the antenna 110, and wherein the platform includes the local display 26.

Figure 11:
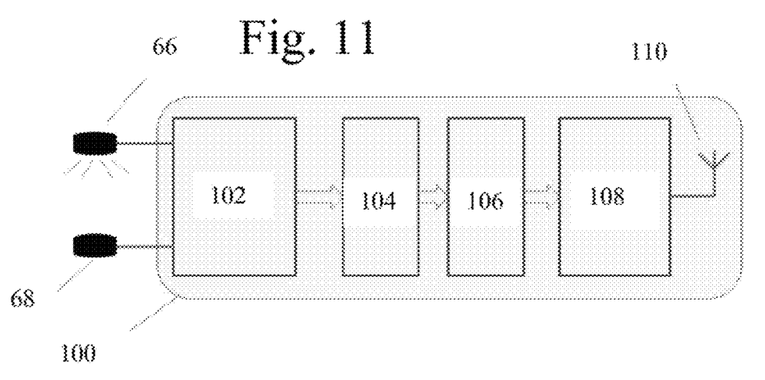
FIG. 11 is a schematic of the components of an electronic circuit of the controller having a detector employing light detection.

As seen in FIG. 11, in a further configuration, the detector 60 includes a light source 66 and a light receiver 68 configured to provide the light, wherein the light receiver can directly detect light transmitted by the light source. The detector 60 detects the presence of the animal by disturbance of the light transmission between the light source 66 and light receiver 68. Thus, an interruption of the light signal at the light receiver 68 indicates a presence of the animal 12 and thus is an event detection. In FIG. 11, the detector 60 includes the light source 66 and the light receiver 68 located, in substantially the same plane. In this configuration, the presence of the animal 12 is detected by disturbance of the reflected light from objects illuminated by the light source 66.

Figure 12:
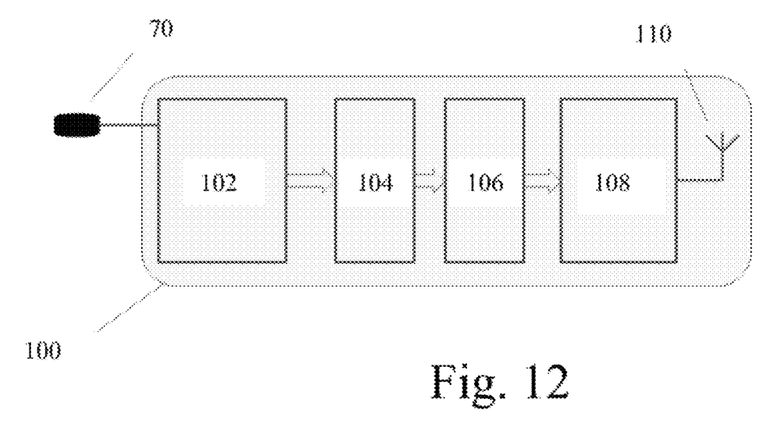
FIG. 12 is a schematic of the components of an electronic circuit of the controller having a detector employing infrared heat detector.

In FIG. 12, the platform 20 is shown with at least one detector 60 connected to the controller 100, wherein the controller includes the electrical interconnection circuit 102 interfacing with the detector, the analog to digital conversion circuit 104 in connected to the processor 106 in communication with the communications module 108, such as a wireless communications circuit with two-way communications and the antenna 110, wherein the detector is an infrared (IR) sensor 70, and thus senses a local infrared radiation, such as associated with the animal 12. A signal corresponding to the sensed local infrared radiation is sent from the detector 60 to the controller 100. It is contemplated the IR sensor 70 can be an active sensor or a passive sensor, as known in the art.

The controller 100 includes electrical circuits, such as signal processors 106, and can be implemented as a programmed desk or laptop computer, as well as a dedicated computer, circuitry, or processors. The controller 100 can be readily programmed to perform the recited calculations, or derivations thereof, to provide determinations of the detector as set forth herein.

Thus, the controller 100 can include the electrical circuit 102 in communication with the detector 60. The controller 100 can regularly poll the detector 60 or an interrupt signal can be generated by the detector to indicate the event detection to the controller. The controller 100 can be configured to generate the feedback indicator corresponding to a combination of signals from a plurality of detectors 60, wherein the controller employs the signals from the separate detectors to confirm a status, presence, or location of the animal 12.

The controller 100 can also include or be in communication with a local memory 112 such as a non-volatile storage, and/or a remote storage, such as in the cloud 120. The remote storage 120 can include processing capability or programming such as software as a service as a service (SaaS based AI and/or Machine Learning model) to learn about development and behavior of the respective domesticated animal or breed if the domesticated animal is a pure breed.

The communications module 108 of the controller 100 is configured to provide at least one of wireless or wired communication from the controller to the caretaker, such as a UE 200 of the caretaker. Thus, the controller 100 can include a transmitter 114 and a receiver 116 (shown in FIG. 9) configured to provide wireless communication as known in the art. The UE 200 includes any smart phone, mobile phone, computer, tablet, wearable device, desktop, personal computer, and the like. An exemplary UE 200 can include a display, a user interface, a processor, a memory storing computer program instructions, a transmitter, and a receiver as known in the art. The UE 200 is operable to display, receive user inputs via the user interface (text or audio) and is able to transmit and receive data through wired or wireless connections. Examples of wireless UEs 200 to which communications can be sent are cellphone, personal computer, or 'smart home' device such as an Alexa® device of Amazon Technologies, Inc. or Google's Home device.

The system 10 can include a speaker or sound generator 80 for creating the feedback indicator that is perceptible by the animal 12. The speaker 80 can be carried by the platform 20 and can be remote and receive a wireless transmission front the controller 100 to generate a corresponding sound.

The controller 100 is configured to generate the feedback indicator to the domesticated animal 12 and the caretaker message to at least one caretaker.

In generating the feedback indicator, the controller 100 is configured to generate the feedback indicator (an animal directed alert) alter a predetermined feedback delay from the event detection. If the animal 12 leaves the platform 20 prior to expiration of the feedback delay (a minimum period of time), then the controller reverts to await the next event detection. That is, only after the animal 12 has remained on platform 20, or the designated area, for a time which is longer than the feedback delay, does the controller 100 generate the feedback indicator to the animal. The feedback indicator (animal directed alert) can be any indicator sensed by the animal 12, such as a sound, a tone, a bell, whistle, as well as an imparted vibration to the platform 20, or a visual signal such as a light which can be from a separate light or the display of the platform, as well as any combination or sub combination of these types of indicators.

The length of the feedback delay between the event detection and the feedback indicator can be set by the controller 100 to any of a variety of lengths. In one configuration, it has been found effective for the feedback delay between the event detection and the feedback indicator to be between 1 second and 30 seconds, and in further configurations, between 3 seconds and 7 seconds, with a 5 second delay having been appropriate.

If the feedback delay (predetermined amount of time) does not expire with the animal 12 in the corresponding location, then the controller 100 reverts to awaiting the next event detection. That is, if the animal 12 does not remain in the detecting (triggering) location or position for the entire feedback delay (predetermined amount of time), then the controller 100 does not provide the feedback indicator to the animal.

Conversely, once an animal 12 learns it will be rewarded for triggering an event detection (such as the animal learning it will be let out when the feedback indicator is given), the animal may then begin to trigger the event detection too often. The controller 100 includes an adjustable lockout period configured to prevent the animal 12 from triggering subsequent event detections within the lockout period (predetermined period). That is, the controller 100 locks out certain event detections from generating feedback indicator. The controller 100 can go into a lockout mode once the animal 12 has triggered a given number of event detections within a certain time, or even after a single event detection. The length of the lockout period is the time between the last feedback indicator and the next event detection that results in a feedback indicator. In one configuration, upon the controller 100 providing the feedback indicator for a given animal 12, the controller will then go into the lockout mode for a certain amount of time, during which no feedback indicators will be generated. After the lockout period, the feedback indicator will be generated for that animal 12 upon the next event detection. The duration of the lockout period can be adjusted by the controller 100. By setting the controller 100 to an appropriate lockout period, the controller can assist in preventing the unwanted behavior of too many feedback indicators and caretaker notifications.

In generating the caretaker message, the caretaker message can be subject to a caretaker delay between the event detection and the transmission of the caretaker message. Typically, the caretaker delay is as long or longer than the feedback delay. While it is contemplated the caretaker delay can be shorter than the feedback delay, such timing can result in "false" alarms with caretaker messages sent without the animal 12 getting the feedback indicator, it is expected that the caretaker delay will be equal to or slightly greater than the feedback delay.

The caretaker message can be a wireless transmission from the electrical circuit, such as the communications module of the controller to the caretaker, via the UE 200. The controller 100 can be configured to generate the caretaker message to a number of pre-determined UEs 200, such as at least one remote wireless device, including a cellphone, a personal computer, or a smart-home device such as Alexa device of Amazon Technology Inc or Google's Home device.

The controller 100 can include configured to wirelessly transmit the caretaker message such as an SMS, an e-mail, or a notification mobile applications to one or more remote wireless UEs 200 associated with the caretaker. The controller 100 can be programmed with the addresses to which the caretaker message is sent. These addresses could be in the form of cellphone numbers, e-mail addresses, IP addresses, or any combination thereof. In one configuration, these addresses can be changed by the user. For example, the cellphone number of a caretaker, such as a dog sitter, can be added if they are placed in charge of the animal 12. This could be done via an application on a cellphone.

In addition to transmitting the event detection in the caretaker message, the controller 100 can include additional data with the caretaker message, including but not limited to physiological data associated with the event detection, such as weight. It is further contemplated, the controller 100 can transmit the caretaker message to the remote storage for contemporaneous or subsequent analysis. In one configuration, the data at the remote storage 120 can be accessed by or provided to further caretakers, such as veterinarians or even research institutes.

In one configuration of the controller 100, the processor 106 records time-stamped information relating to the occurrence of the event detection. In those configurations of the platform 20 that include the weight sensing detector, the controller 100 can record select time stamped data of the event detection such as the time of the behavior or action time and the sensed weight. The recorded data can be retained in the format of the local non-volatile storage and/or the remote storage in the cloud. The recorded data of the event detection (such as behavior action times, weight, etc.) can also be electronically shared with a remote caretaker, such as a veterinarian. As set forth above, the recorded data also be analyzed at the remote location in a SaaS based AI and/or Machine Learning model to learn about animal breed development and behavior. It is contemplated that the UE 200 can include software to provide output displays of historic weigh information in any of a variety s of formats, such as but not limited to charts or tables.

In other configurations, the platform 20 can include or the controller 100 can be operably connected to additional sensors 62 incorporated into the platform. The additional sensors 62 can be configured for sensing heart rate, heart rate regularity, breathing rate, or blood oxygenation levels of the animal as known in the art. The sensors 62 can also include image capture or optical sensors as well as electrical sensors configured to detect physiological signals from the animal 12. Further sensors 62 can provide local environmental data such as but not limited to temperature humidity and even brightness.

The controller 100 can also be configured to identify the animal 12 that triggered the event detection. In one configuration, if there is a larger dog and a smaller dog, the controller 100 can be configured to relate a given weight or band of weight to the first dog and a different weight or band of weights to the second dog. Thus, the behavior of each dog can be independently tracked by the controller 100, and the corresponding feedback delay, feedback indicator, caretaker delay, and lockout period can be applied. It is contemplated a variety of mechanisms can be used to distinguish different animals 12, such as weight, RFID tags, image recognition, as well as speech/voice recognition. Thus, as the controller 100 can distinguish between animals 12 triggering the event detection, one animal may have a first feedback delay, a first caretaker delay, and a first lockout period and a second animal can have a second feedback delay, a second caretaker delay, and a second lockout period, wherein the delays are different from each other and the lockouts are different from each other. Therefore, the controller 100 can associate the event detection with a specific animal 12 and then apply the corresponding feedback delay to generating the feedback indicator, the corresponding caretaker delay in transmitting the caretaker message, as well as the corresponding associated lockout period.

It is contemplated the platform 20 can be positioned inside an animal housing such as a kennel. The detected physiological signals from the animal 12 can be used by the facility or the caretaker to measure animal physiology, since in many cases the kennel may be in a stressful environment for the animal, such as extremes of temperature, or prolonged confinement. Measurement of animal stress or other physiological signals can alert the caretaker to problems which need to be addressed.

Figure 13:
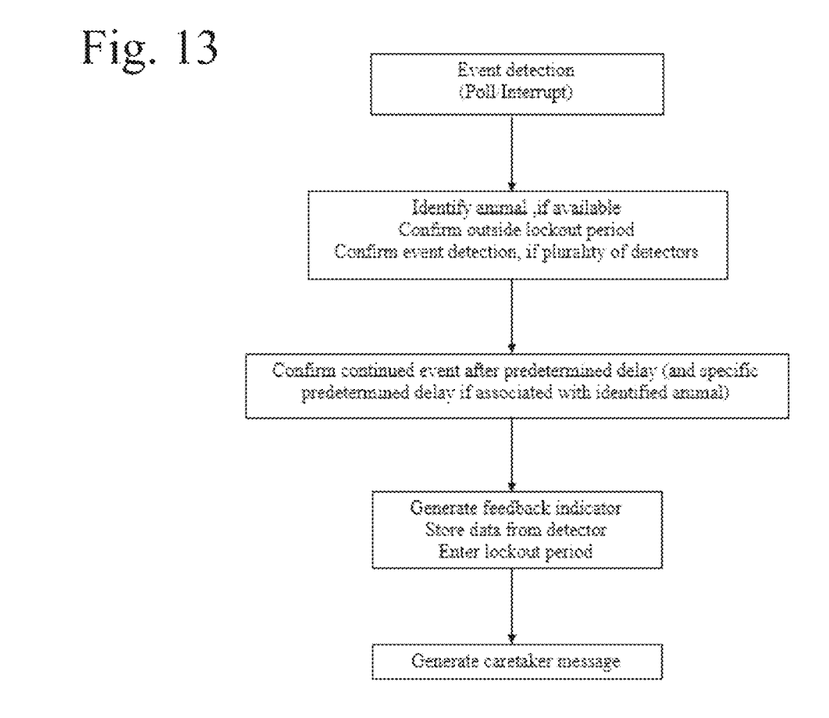
FIG. 13 is a schematic flow chart of the steps in generating a feedback indicator to the animal.

Referring to FIG. 13, in one embodiment, the system 10 operates by the steps of (i) detecting, from the detector 60, the presence of the animal on the platform 20; (ii) continuing to monitor the detector to ensure the animal remains on the platform during the feedback delay (a predetermined amount of time); and (iii) upon expiration of the feedback delay (predetermined amount of time), presenting the feedback indicator to the animal.

In one configuration, presenting the feedback indicator to the animal, includes activating the speaker to generate an audible signal after the feedback delay.

In addition, the method can include the step of the controller 100 generating the caretaker message (such as an electronic message) and transmitting the caretaker message to the caretaker after any caretaker delay (before, at or after expiration of the feedback delay), wherein the caretaker message can be automatically sent to the pre-determined remote UE 200, such as a wireless device or devices, such as a cellphone, personal computer, or 'smart home' device such as Amazon's Alexa or Google's Home device. The caretaker message can include weight information for general information or recording purposes. Software on the remote wireless UE can provide output displays of historic weigh information such as charts or tables.

In a further configuration, the controller 100 can be connected either directly or wirelessly to a door or a door actuator, which could be activated on command from the controller. The controller 100, in response to the signal from the detector 60 (the event detection), can instruct the door or actuator so as to selectively let the animal 12 pass through the door. In select configurations, the controller 100 is operably connected to the door (or the actuator), wherein the controller can dispose the door (or the actuator) between an open position and a closed position. Thus, the controller 100 can allow the animal to pass through the door without requiring any caretaker intervention. The present system 10 can accommodate when the caretaker is remote, such as at work during daytime hours, and the animal 12 can be given automatic access to a garden area.

In operation, the first step in the use of the present system is to train the animal 12. Animals, and in particular canines, can be trained using classical conditioning methods. For example, the Pavlov's Dog technique involves positive reinforcement by means of a reward system when the dog behaves correctly. In the case of the present system, the dog receives a reward (the dog will get let out to relieve itself), once it has completed a certain action (i.e. mounting the platform and waiting for the audible sound (the feedback indicator)).

More specifically, teaching a dog to "place" is a common training practice, such as from the American Kennel Club, How to Teach Your Dog to Go to Their Place, by Stephanie Gibeault, December 2020. The present system 10 adapts this common command and utilizes it for animal to human communication. For example, the dog learns that its "place" is on the platform when it needs to communicate to a human that it needs to go outside for bathroom purposes.

Thus, the animal 12 is first trained to carry out a particular behavior, such as going to the platform 20, occupying the platform, and waiting until a short predetermined time (the feedback delay) has elapsed (typically on the order of less than 10 seconds) until the feedback indicator is provided, such as the sound. In training, this sound alerts any caretakers within audible range that the animal requires attention, and the appropriate action can be taken such as opening a door.

With suitable training, the dog will gradually associate its own action with a particular desired human reaction. Once this stage is reached the training phase is complete, and the dog can carry out the action autonomously. An advantage of the present system 10 is that once the training is complete, anybody, not necessarily the original trainer, can understand what the dog is attempting to communicate, in contrast with prior systems in which the caretaker is required to interpret the actions of the dog.

As set forth above, the controller 100 can also alert remote caretakers by wireless messaging, such as electronic SMS, e-mail or mobile applications notification. This remote messaging is advantageous when the caretaker is temporarily outside audible range of the controller. In addition, this feature allows the remote monitoring of the dog's behavior when the primary caretaker is remote and a secondary caretaker is attending to the dog. Further, the recording of the behavior pattern of the animal allows the event data to be passed to the remote processing where the data can be recorded and analyzed.

As set forth above, the message from the controller 100 can also be sent to a home monitoring device such as the Alexa® device, which could provide an audible broadcast message throughout a household, or automatically activate a door release mechanism to allow the dog out. By incorporating the voice-based AI-powered digital assistant, the need for the dog to wear a special door-opening device, such as those currently required by current devices on the market is removed.

As set forth above, the controller 100 can also measure the weight of the animal 12 while the animal is on the platform 20. This additional information can be sent within the caretaker message for the purposes of monitoring weight over time. The capture of weight information can be used in the monitoring and management of weight, weight reduction, growth of young dogs, pregnancy progress.

The disclosure provides a method including the steps of (i) detecting, by the detector 60, a presence of the animal 12 on the platform 20, wherein the detecting can be through a periodic polling of the detector, or by an interrupt signal generated by the detector; (ii) continuing to monitor the detector to ensure that the animal remains on the platform for a minimum period of time, such as the feedback delay; and (iii) upon passing the minimum period of time, such as the feedback delay, presenting the feedback indicator to the animal, such as activating a speaker to generate an audible alert.

An additional advantage of the present system 10 lies in that it can simplify the bathroom training process and enhance the obedience of the animal 12. It can also be beneficial to the relationship between the caretaker and their pet or working animal companion, as the system provides another mode of communication.

This disclosure has been described in detail with particular reference to an embodiment, but it will be understood that variations and modifications can be effected within the spirit and scope of the disclosure. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A domesticated animal training apparatus comprising:
   (a) a first detector configured to generate a signal corresponding to a presence of the domesticated animal in a predetermined position relative to the first detector; and
   (b) a controller operably connected to the first detector, the controller configured to (i) generate a feedback indicator perceptible by the animal after a first predetermined delay from the signal perceived by the domesticated animal, and (ii) lockout for a predetermined period, a subsequent feedback indicator in response to a subsequent signal from the first detector corresponding to the presence of the domesticated animal in the predetermined position relative to the first detector, and (iii) generate a caretaker message, wherein the caretaker message is delayed for a period of time which is longer than the first predetermined delay of the feedback indicator.

2. The apparatus of claim 1, wherein the first detector is a weight scale.

3. The apparatus of claim 1, wherein the first detector is an accelerometer.

4. The apparatus of claim 1, wherein the first detector includes an electromagnetic emitter and an electromagnetic receiver.

5. The apparatus of claim 1, further comprising a second detector connected to the controller, the second detector configured to generate a second signal corresponding to the presence of the domesticated animal relative to at least one of the first detector and the second detector.

6. The apparatus of claim 1, wherein the caretaker message is transmitted through a wireless communication to a portable communication device.

7. The apparatus of claim 1, wherein the controller is configured to identify the domesticated animal corresponding to the signal.

8. The apparatus of claim 1, further comprising an RFID reader operably coupled to the controller.

9. The apparatus of claim 1, further comprising a platform sized to support the domesticated animal, the platform further configured to house the first detector.

10. The apparatus of claim 1, wherein the first predetermined delay is between 1 second and 30 seconds.

11. The apparatus of claim 1, wherein the first detector is configured to weigh the domesticated animal and the controller is configured to transmit the weight of the domesticated animal in a caretaker message.

12. The apparatus of claim 1, wherein the controller is further configured to generate a caretaker message after the first predetermined delay.

13. The apparatus of claim 1, wherein the first detector includes a sensor that includes a friction reducing inducing surface configured to contact a floor.

14. The apparatus of claim 1, wherein the controller is configured to identify the domesticated animal based on at least one of a weight of the domesticated animal, an image of the domesticated animal, and a responsive tag carried by the domesticated animal.

15. An apparatus for training a domesticated animal, the apparatus comprising:
(a) a platform configured to be occupied by the domesticated animal, the platform having a weight sensor configured to generate a signal corresponding to a weight of the domesticated animal in response to a presence of the domesticated animal relative to the weight sensor; and
(b) a controller operably connected to the weight sensor, the controller configured to generate (i) a feedback indicator perceptible by the animal after a first predetermined delay from the generation of the signal perceivable by the domesticated animal and (ii) a caretaker message transmitted through a wireless communication to a portable communication device, wherein a delay of the caretaker message is longer than the first predetermined delay of the feedback indicator.

16. The apparatus of claim 15, wherein the caretaker message is transmitted after the first predetermined delay.

17. The apparatus of claim 15, wherein the caretaker message includes a weight of the domesticated animal.

18. The apparatus of claim 15, wherein the controller is configured to vary the first predetermined delay.

19. The apparatus of claim 15, wherein the controller is configured to lockout a generation of a subsequent feedback indicator for a predetermined period after the generation of the feedback indicator.

20. A method for training a domesticated animal, the method comprising:
(a) receiving a signal from a detector, the signal corresponding to a presence of a domesticated animal in a predetermined location;
(b) generating, after a first delay of a predetermined period of time from receiving the signal (i) a feedback indicator perceptible to the animal and (ii) a caretaker message directed to a caretaker, wherein the caretaker message is delayed for a period of time which is longer than the first delay of the feedback indicator; and
(c) delaying generation of a subsequent feedback indicator until after a second predetermined period from the generated feedback indicator in response to a subsequent signal from the detector corresponding to the presence of the domesticated animal in the predetermined position relative to the detector.

\* \* \* \* \*